No. 851,170. PATENTED APR. 23, 1907.
G. W. ISRAEL.
SEED PLANTER.
APPLICATION FILED FEB. 14, 1906. RENEWED SEPT. 17, 1906.
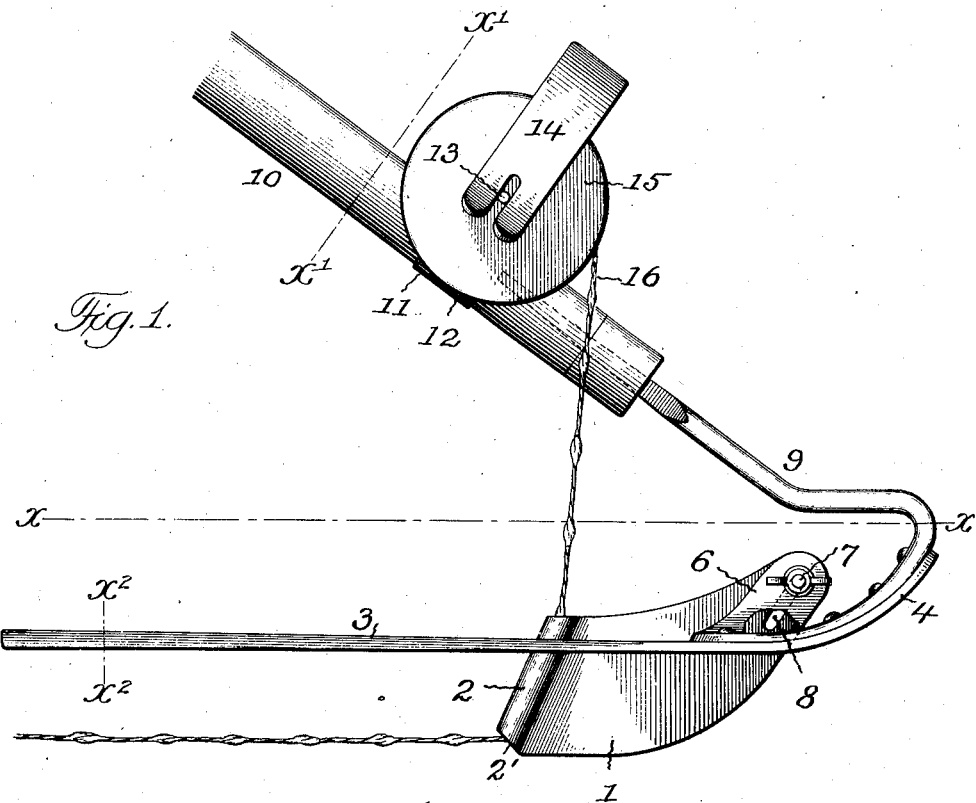
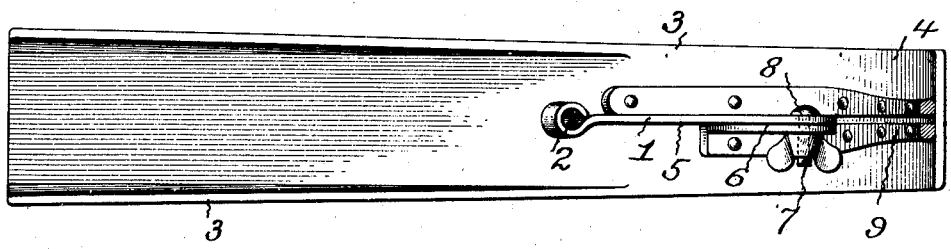
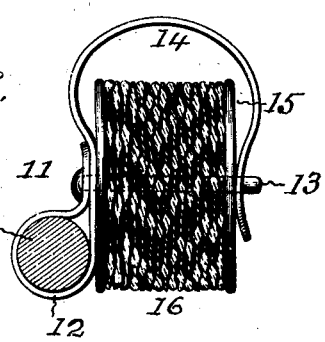
Attest:
John Enders
M. H. Holmes.
Inventor:
George W. Israel,
by Robert Burns
Attorney.

UNITED STATES PATENT OFFICE.

GEORGE W. ISRAEL, OF CHICAGO, ILLINOIS.

SEED-PLANTER.

No. 851,170.  Specification of Letters Patent.  Patented April 23, 1907.

Application filed February 14, 1906. Renewed September 17, 1906. Serial No. 334,983.

*To all whom it may concern:*

Be it known that I, GEORGE W. ISRAEL, a citizen of the United States of America, and a resident of Chicago, in the county of Cook and State of Illinois, have invented certain new and useful Improvements in Seed-Planters, of which the following is a specification.

This invention relates to that type of seed planters in which a flexible strip or carrier containing the seeds in spaced relation is placed in the ground furrow at the proper depth; and the present improvement has for its object to provide a simple and efficient structural formation and combination of parts whereby such mode of seed planting is effected in an easy and rapid manner, and which provide a light and compact implement for the purpose capable of easy operation by hand, all as will hereinafter more fully appear.

In the accompanying drawings:—Figure 1 is a side elevation of a hand planter, embodying the present improvements. Fig. 2 is a sectional plan view of the same, on line $x$—$x$, Fig. 1. Fig. 3 is a detail section on line $x'$—$x'$ Fig. 1, of the spool carrier and its accessories and. Fig. 4 is a detail transverse section of the furrow covering plate or runner, on line $x^2$—$x^2$ Fig. 1.

Similar numerals of reference indicate like parts in the several views.

Referring to the drawings:—1 is the vertical furrow opening blade of the implement, formed with an inclined and rounded forward end adapting it to readily enter the ground in forming a furrow, and with a vertically arranged oblique throat 2, at its rear end for the guidance of a seed carrying string or strip into the furrow as formed. Such furrow opening blade will usually be formed of a plate of metal cut to the required form with its rear end bent around to form the throat 2 aforesaid, and with a view to permit a ready passage of the said carrying string aforesaid, into the furrow, the lower and rear corner 2' of the blade 1, will be angularly cut away or beveled as shown in Fig. 1.

3 is a furrow closing plate or runner formed with an upturned forward end 4, and adapted to run upon the top of the ground and close the furrow in its passage over the same, as well as constitute a depth gage for the furrow opening blade 1, as hereinafter more fully set forth.

5 is a central longitudinal opening formed in the plate 3, and adapted to receive the furrow opening blade 1, and maintain the same in a vertical position.

6 is a vertical flange or ear secured upon the plate or runner 3; and 7 is a transverse clamping screw passing through said flange or ear 6, and through an elongated slot 8, in the furrow opening blade 1, to secure the parts together in a vertically adjustable relation, and thereby gage the depth of the furrow formed by the blade 1.

9 is an inclined and rearwardly extending shank secured to the furrow closing plate 3, and adapted for rigid engagement with the lower end of the pole or handle 10, by which the implement is manipulated.

11 is a spool holder secured to the handle 10 by a clip 12, or other usual attaching means, and provided with a spool carrying arbor 13, and with a resilient curved finger 14, adapted to bear upon the outer end of the spool 15, carrying a seeded string or strip 16 to hold said spool upon the arbor 13, and at the same time afford frictional resistance to prevent too free rotation of the spool and excessive unwinding of the seeded strip or string 16 in the practical use of the implement.

Having thus fully described my said invention, what I claim as new and desire to secure by Letters Patent, is;—

1. In a seed planter, the combination of a furrow opening blade provided with a guide throat at its rear end, a furrow closing runner provided with a central longitudinal opening for the passage of the furrow opening blade, and a seeded strip carrying spool carried in adjacent relation to the guide throat aforesaid and adapted to supply the seeded strip thereto.

2. In a seed planter, the combination of a furrow opening blade provided with a guide throat at its rear end, a furrow closing runner provided with a central longitudinal opening for the passage of the furrow opening blade, means for effecting a vertical adjustment between the parts, and a seeded strip carrying spool carried in adjacent relation to the guide throat aforesaid and adapted to supply the seeded strip thereto.

3. In a seed planter, the combination of a furrow opening blade provided with a guide throat at its rear end, a furrow closing runner provided with a central longitudinal opening for the passage of the furrow opening blade, an operating handle attached to the furrow closing runner, and a seeded strip carrying spool mounted on said handle in adjacent relation to the guide throat aforesaid and adapted to supply the seeded strip thereto.

4. In a seed planter, the combination of a furrow opening blade provided with a guide throat at its rear end, a furrow closing runner provided with a central longitudinal opening for the passage of the furrow opening blade, means for effecting a vertical adjustment between the parts, an operating handle attached to the furrow closing runner, and a seeded strip carrying spool mounted on said handle in adjacent relation to the guide throat aforesaid and adapted to supply the seeded strip thereto.

5. In a seed planter, the combination of a furrow opening blade provided with a guide throat at its rear end, a furrow closing runner provided with a central longitudinal opening for the passage of the furrow opening blade, an operating handle attached to the furrow closing runner, a spool holder secured to said handle and having a carrying arbor and a resilient curved finger, and a seeded strip carrying spool arranged on said arbor in adjacent relation to the guide throat aforesaid and adapted to supply the seeded strip thereto.

6. In a seed planter, the combination of a furrow opening blade provided with a guide throat at its rear end, a furrow closing runner provided with a central longitudinal opening for the passage of the furrow opening blade, means for effecting a vertical adjustment between the parts, an operating handle attached to the furrow closing runner, a spool holder secured to said handle and having a carrying arbor and a resilient curved finger, and a seeded strip carrying spool arranged on said arbor in adjacent relation to the guide throat aforesaid and adapted to supply the seeded strip thereto.

7. In a seed planter, the combination of a furrow opening blade provided with a guide throat at its rear end, a furrow closing runner provided with a central longitudinal opening for the passage of the furrow opening blade, means for effecting a vertical adjustment between the parts, the same comprising a vertical flange on the furrow closing runner, an elongated slot in the furrow opening blade and a clamping bolt connecting the parts, and a seeded strip carrying spool carried in adjacent relation to the guide throat aforesaid and adapted to supply the seeded strip thereto.

8. In a seed planter, the combination of a furrow opening blade provided with a guide throat at its rear end, a furrow closing runner provided with a central longitudinal opening for the passage of the furrow opening blade, means for effecting a vertical adjustment between the parts, the same comprising a vertical flange on the furrow closing runner, an elongated slot in the furrow opening blade and a clamping bolt connecting the parts, an operating handle attached to the furrow closing runner, and a seeded strip carrying spool mounted on said handle in adjacent relation to the guide throat aforesaid and adapted to supply the seeded strip thereto.

9. In a seed planter, the combination of a furrow opening blade provided with a guide throat at its rear end, a furrow closing runner provided with a central longitudinal opening for the passage of the furrow opening blade, means for effecting a vertical adjustment between the parts, the same comprising a vertical flange on the furrow closing runner, an elongated slot in the furrow opening blade and a clamping bolt connecting the parts, an operating handle attached to the furrow closing runner, a spool holder secured to said handle and having a carrying arbor and a resilient curved finger, and a seeder strip carrying spool arranged on said arbor to supply the seeded strip thereto.

10. In a seed planter, the combination of a furrow opening blade provided with a guide throat at its rear end and having a beveled rear and lower corner, a furrow closing runner provided with a central longitudinal opening for the passage of the furrow opening blade, and a seeded strip spool carried in adjacent relation to the guide throat aforesaid and adapted to supply the seeded strip thereto.

11. In a seed planter, the combination of a furrow opening blade provided with a guide throat at its rear end and having a beveled rear and lower corner, a furrow closing runner provided with a central longitudinal opening for the passage of the furrow opening blade, means for effecting a vertical adjustment between the parts, and a seeded strip carrying spool carried in adjacent relation to the guide throat aforesaid and adapted to supply the seeded strip thereto.

12. In a seed planter, the combination of a furrow opening blade provided with a guide throat at its rear end, a furrow closing runner having an upturned forward end and provided with a central longitudinal opening for the passage of the furrow opening blade, and a seeded strip carrying spool carried in adjacent relation to the guide throat aforesaid and adapted to supply the seeded strip thereto.

13. In a seed planter, the combination of a furrow opening blade provided with a guide throat at its rear end, a furrow closing runner having an upturned forward end and provided with a central longitudinal opening for the passage of the furrow opening blade, means for effecting a vertical adjustment between the parts, and a seeded strip carrying spool carried in adjacent relation to the guide throat aforesaid and adapted to supply the seeded strip thereto.

14. In a seed planter, the combination of a furrow opening blade provided with a guide throat at its rear end, a furrow closing runner having an upturned forward end and provided with a central longitudinal opening for the passage of the furrow opening blade, an operating handle attached to the furrow closing runner, and a seeded strip carrying spool mounted on said handle in adjacent relation to the guide throat aforesaid and adapted to supply the seeded strip thereto.

Signed at Chicago, Illinois, this 10th day of February 1906.

GEORGE W. ISRAEL.

Witnesses:
ROBERT BURNS,
M. H. HOLMES.